P. P. McPEAK AND B. A. RAINS.
TIRE HOLDER.
APPLICATION FILED JUNE 12, 1917. RENEWED MAR. 8, 1919.
1,317,584.
Patented Sept. 30, 1919.
2 SHEETS—SHEET 1.
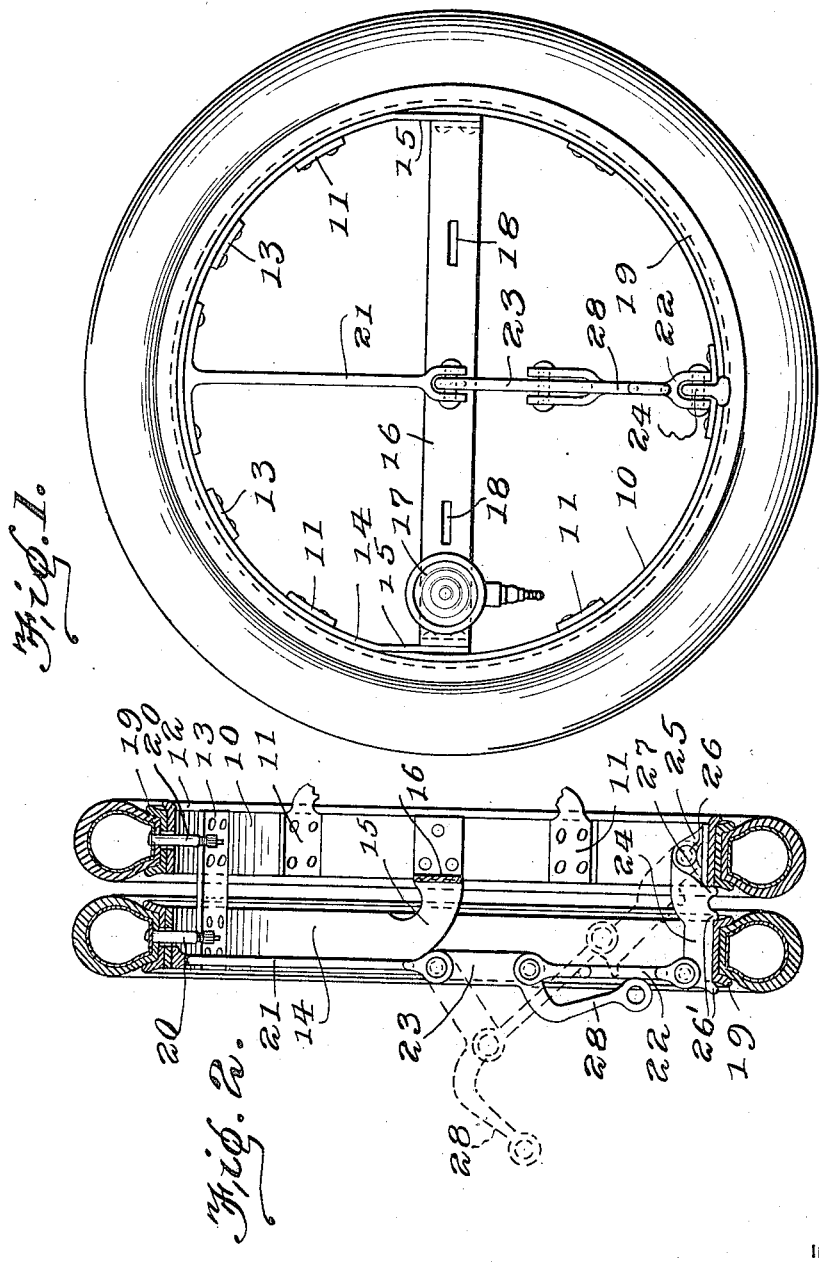
WITNESSES
INVENTOR
P. P. McPeak
B. A. Rains
BY Victor J. Evans
ATTORNEY

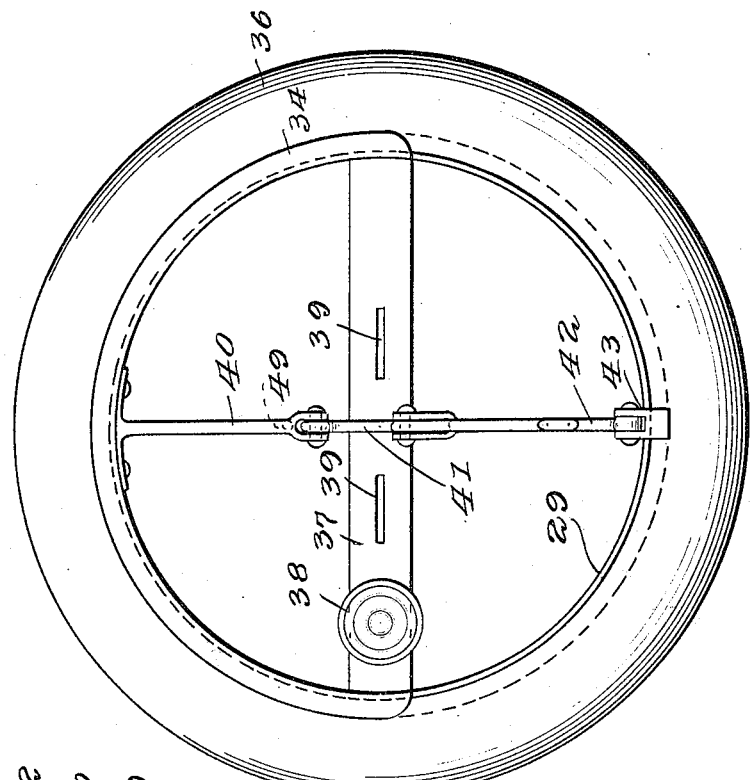
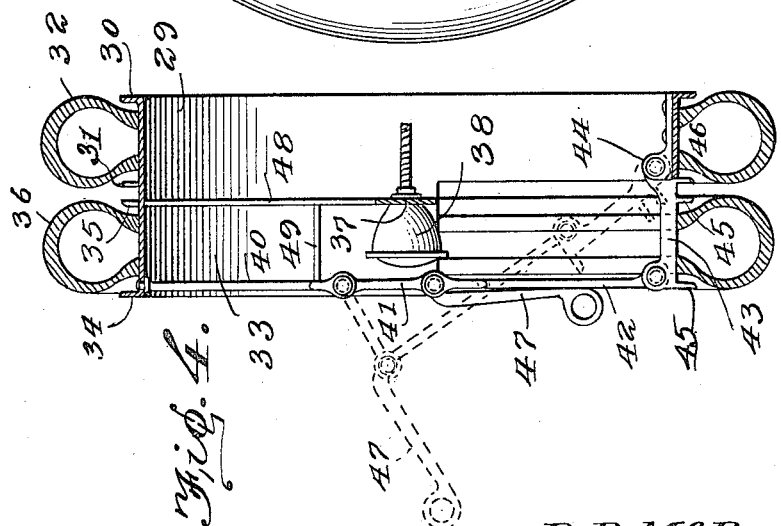

UNITED STATES PATENT OFFICE.

PRESSLEY P. McPEAK AND BERT A. RAINS, OF WILLITS, CALIFORNIA.

TIRE-HOLDER.

1,317,584.  Specification of Letters Patent.  Patented Sept. 30, 1919.

Application filed June 12, 1917, Serial No. 174,399. Renewed March 8, 1919. Serial No. 281,546.

*To all whom it may concern:*

Be it known that we, PRESSLEY P. MC-PEAK and BERT A. RAINS, citizens of the United States, residing at Willits, in the county of Mendocino and State of California, have invented new and useful Improvements in Tire-Holders, of which the following is a specification.

This invention comprehends the provision of a tire holder designed to support two or more spare tires at the rear of motor operated vehicles, in a manner whereby the tires can be placed upon the holder or removed therefrom when the occasion requires, with the least effort and exertion.

In carrying out my invention I provide a tire holder designed for use with a tire carrying rim, or for supporting the tire shoe or casing without a demountable rim, the invention being simple in construction, and very efficient for the purpose intended.

The invention is further characterized by being provided with a brace, which serves in the capacity of a support for the rear lamp, and the license plates.

Other important objects of the invention will appear as the nature of the same is better understood from the following detail description, taken in connection with the accompanying drawings, the invention residing in the construction, combination and arrangement of parts as claimed.

In the drawings forming part of this specification like numerals of reference indicate similar parts in the several views, wherein:—

Figure 1 is a rear elevation of the holder constructed in accordance with one embodiment of the invention.

Fig. 2 is an approximate central vertical sectional view.

Fig. 3 is a rear elevation of a modified form of holder.

Fig. 4 is a view similar to Fig. 2 of the modified form of the invention.

Before entering into a detail description of what is herein shown and described, I desire to have it understood that I do not consider the disclosure restrictive, as it merely illustrates certain embodiments of the invention, and that such changes may be resorted to when desired as fall within the scope of what is claimed.

Referring to the drawings in detail, and particularly to Figs. 1 and 2, 10 indicates a rim which is adapted to be fixed permanently at the rear of the motor operated vehicle, through the instrumentality of brackets 11. While the rim may be of any suitable construction, it is by preference provided with a circumferentially disposed flange 12 at one side, the flange being flared outwardly from the rim, while the opposite side of the rim has a straight edge. Secured to the inner periphery of the rim 10 is a plurality of metal strips 13, which as clearly illustrated in Fig. 2 project an appreciable distance beyond the straight edge of the rim, and are secured to the inner periphery of an auxiliary rim 14 for supporting the latter. The rim 14 is semicylindrical in contour, the opposite extremities 15 of the rim 14 being curved in the direction of the rim 10 and secured in any suitable manner to the inner periphery of the latter at diametrically opposite points. The opposite side edges of the rim 14 are preferably straight, while it is manifest from the foregoing description that the auxiliary rim 14 is rigidly supported upon the rim 10 in spaced parallel relation thereto. The extremities 15 of the auxiliary rim are connected by a transversely disposed brace 16, the latter in addition to affording the holder as an entirety the requisite rigidity, is further utilized to support the tail light 17, and the license plates (not shown). For this latter mentioned purpose the brace 16 is provided with spaced elongated slots 18. The rims 10 and 14 respectively are adapted to support the demountable tire carrying rims 19 of usual construction, the rims 10 and 14 respectively being also provided with suitable apertures to receive the valve stems 20 of the tires.

Depending centrally from the rim 14 is an arm 21, while swingingly associated with the arm 21 is an arm 23 to which is pivoted a link 22. The arm 23 and link 22 are normally disposed in vertical alinement with the arm 21 but are susceptible of vertical swinging movement for the purpose to be presently described. Pivotally connected with the free extremity of the link 22 is one extremity of a locking bar 24, the opposite extremity being pivotally associated with a lug 25 projecting from the inner periphery of the rim 10 as at 26. In the normal position of parts, the locking bar 24 is horizontally disposed. Along one of its longitudinal edges the locking bar 24 is formed with spaced lugs 26' which engage the opposite sides of the outer tire rim, while projecting from the same edge of the locking bar is a lug 27 which engages the rim 10 and the tire carrying rim 19 positioned thereon. It is of course obvious that when the locking bar is in the position shown by full lines in Fig. 2, the said bar is immovable, and the lug 27 coöperates with the flange 12 of the rim 10, to immovably hold the inner tire carrying rim 19 in proper position thereon. Again, the spaced lugs 26' engaging the outer tire carrying rim 19 at a point diametrically opposite the rim 14, coöperate with the latter to immovably support the tire carrying rim in position upon the rim 14. A lever 28 is formed upon the lower end of the arm 23 at its point of juncture with the link 22.

In practice when it is desired to remove one or both tires from the holder, the lever 28 is swung outwardly, and a continued pull upon the lever breaks the joint between the link 22 and the arm 23 causing these elements to assume the position shown by dotted lines in Fig. 2. During the movement of the arm 23 to this position, the locking bar 24 is swung upwardly to a position where the lugs 26' and 27 respectively are wholly out of engagement with the rim 10, and outer and inner rims 19. The tire supported upon the rim 14 can then be conveniently lifted off said rim, as can also the tire carrying rim supported upon the rim 10. By giving the rim 14 semicylindrical formation, it is clear how the rim 19 can be removed from the rim 10 just the same as if the rim 14 was not present, as the latter does not in any way interfere with the removal of the tire carrying rim from the rim 10, or its association therewith. Considering the lever 28 and its associated parts in the position illustrated by dotted lines in Fig. 2, the tire carrying rim or rims may be either placed upon the holder or removed therefrom, subsequent to which the lever 28 is lowered, thereby moving the link 22, and locking bar 24 to their normal position.

In Figs. 3 and 4 I have disclosed a modified form of the invention, the invention in this instance being designed to accommodate or support two or more tire shoes or casings without being associated with a demountable rim. In this instance the rim 29 is formed with a circumferential flange 30 at one side, the latter coöperating with lugs 31 to support the shoe or casing 32 in proper position upon the rim. The lugs 31 projecting outwardly from the rim 29 at spaced intervals about the circumference of the rim, and in parallelism with the flange 30 as clearly shown in Fig. 4. It might here be stated, that a circumferential flange may be provided upon the rim 29 in place of the lugs 31. The auxiliary rim 33 is of semicylindrical contour, and is integrally connected with the rim 29, being as a matter of fact a continuation of this rim. The outer edge of the rim 33 is formed with a flange 34 which coöperates with lugs 35 to prevent lateral movement of the shoe or casing 36 upon the rim. It might here also be stated that a flange may be formed upon the rim 33 in place of the lugs 35. Extending transversely of the holder is a brace 37 connected with the rim 33 adjacent the extremities thereof, and this brace in addition to increasing the rigidity of the holder in its entirety is further utilized to support the tail light 38 and the license plates (not shown). To permit the license plates to be conveniently attached to the brace 37, the latter is provided with spaced elongated slots 39.

Depending from the inner periphery of the rim 33 is a rigid arm 40 to which a swinging arm 41 is pivoted. A link 42 is pivoted to the arm 41 and also to a locking bar 43. The opposite end of the bar 43 is pivotally associated with a lug 44 projecting from the rim 29. In normal position the locking bar 43 is horizontally disposed, at which time the spaced parallel lugs 45 projecting from the bar engage the opposite sides of the shoe or casing 36 to assist in holding the latter in position upon the rim 33, while an additional lug 46 projecting from the bar engages the adjacent side of the shoe or casing 32, this lug coöperating with the flange 30 of the rim 29 to maintain the shoe 32 properly positioned upon the latter. An extension arm 47 is formed upon the end of the arm 41.

By reason of the construction and arrangement disclosed, it is manifest that when the extension arm is swung outwardly and upwardly, the link 42 is moved to a position whereby the locking bar 43 is moved entirely out of engagement with the shoes or casings 32 and 36 respectively. This inactive position of the parts is illustrated by dotted lines in Fig. 4, and with the parts in this position one or both of the shoes or casings may be very conveniently removed from their respective rims, or placed in position thereon. The link 42, and the locking bar 43 are simultaneously moved to their normal or active position by simply lowering the extension arm 47 to its active position. When in this position the parts are substantially rigid, and serve to maintain the shoes or casings against casual derangement upon their respective rims.

Depending from the inner periphery of the rim 33 directly behind the arm 40 and in parallelism therewith is an additional bracing element 48, the latter having its lower end secured to the adjacent edge of the brace 37, while projecting at right angles from the brace 48 is a rod 49 which is connected to the arm 40 to add to the rigidity of the latter.

It will be manifest from the foregoing description that I have devised a tire holder whereby two or more spare tires can be satisfactorily carried at the rear of the machine, and effectively held upon their supports to insure against loss of the tires, and yet permit the latter to be conveniently removed when desired.

What is claimed is:—

Apparatus of the character described comprising, a stationary rim having its rear end provided with a radially extending flange and its forward edge formed straight; a semi-circular rim arranged in an inverted manner upon one side of the stationary rim and near the upper portion thereof, said semi-circular rim having its inner and outer edges formed straight and its free ends extended laterally for providing forward projections; straps for securing the upper portion of the semi-circular rim to the upper portion of the stationary rim; a substantially horizontal bar extending diametrically of the stationary rim and secured thereto and having the lateral projections of the semi-circular rim secured thereto to strengthen and support the lower end of the same, said bar being also adapted for supporting a tail lamp or the like; a radial stationary arm rigidly secured to the semi-circular rim at its upper portion; a lever pivoted to the lower end of the radial stationary arm; a transverse locking bar provided between its ends with a pair of depending lugs and at its rear end with a depending lug; means for pivotally connecting the transverse locking bar with the stationary rim; and a link pivotally connecting the rear end of the locking bar and lever.

In testimony whereof we affix our signatures.

PRESSLEY P. McPEAK.
BERT A. RAINS.

Copies of this patent may be obtained for five cents each, by addressing the "Commissioner of Patents. Washington, D. C."